United States Patent Office 3,699,039
Patented Oct. 17, 1972

3,699,039
METHOD FOR THE REMOVAL OF COLLOIDAL SUSPENSIONS AND OTHER POLLUTANTS FROM LIQUID WASTES
Calvin Calmon, Arneys Mount Road, Birmingham, N.J. 08011; Allyn Harold Heit, 14 Thornton Place, Mount Holly, N.J. 08011; and Theodore Helfgott, P.O. Box 129, R.D. 2, Storrs, Conn. 06268
No Drawing. Filed Nov. 2, 1970, Ser. No. 86,286
Int. Cl. C02b 1/14
U.S. Cl. 210—28       5 Claims

ABSTRACT OF THE DISCLOSURE

The treatment of waste products polluted with anionic surfactants and other colloidal suspensions with abietic acid amines and derivatives thereof and subsequent filtration by short surging cycles through a compressible absorption filter medium having absorbent and or ion exchange properties.

BACKGROUND OF THE INVENTION

This invention relates generally to the treatment of severely polluted liquids for the removal of contaminants contained therein and particularly to the treatment of laundry wastes for the removal of detergents, anionic surfactants and colloidal suspensions therefrom.

The contaminated effluent liquid from laundering operations, hereinafter referred to as laundry waste, commonly contains synthetic detergents as dissolved or colloidal suspensions therein.

Anionic detergent surfactants and other colloidal materials, are commonly found in commercial detergent formulations. Very small proportions of these materials in sewage and waste effluents cause the formation of highly stable foams and other harmful forms that resist conventional water purification techniques, and even if they eventually degrade into acceptable waste materials, their initial dosage at disposal sites creates conditions unacceptable as safe levels prior to such degradation. The treatment of these wastes to remove these harmful products in general and colloidal surfactants in particular remains a major problem in municipal areas where limited water supplies necessitate recycling of the waste water. The impact of this problem has occasioned a public outcry for more stringent anti-pollution laws and has caused the major manufacturers of synthetic detergents to expend large sums in efforts to create "low-sudsing" and biologically destructible detergents. In spite of the fact that non-biodegradable ingredients have been substantially eliminated from detergents, the need for effective removal of certain anionic surfactants and colloidal suspensions prior to disposal still exists.

Many attempts to solve the above set forth problems have been made in the past, but the solutions evolved have been generally unsatisfactory. For example, one widely used method for the removal of suspended solids from aqueous systems is treatment with coagulants or flocculating agents such as aluminates, activated silica, alum, iron salts, etc. However, much of the contaminant material is not amenable to such treatment because of the relatively fine colloidal size. In addition, the need for bulk chemicals and large containers, coupled with the difficulty in disposing of the precipitated sludges limits the usefulness of this method.

The employment of filtering equipment in conjunction with the use of flocculating agents has provided improved removal methods by reducing the amounts and quantities of chemicals necessary, increasing the settling capacities, and compressing the disposal materials into a relatively smaller sludge volume. However, rapid blinding of the filtering equipment by slime has limited the efficiency of such methods.

Another prior art method specifically directed toward the removal of anionic surfactants is the complexing of the anionic surfactant molecules with an amine acetate of an abietic-type acid, such as the acetic acid salt of dehydroabietylamine. However, this method has not proven satisfactory, because of the large quantities of treatment chemicals required, the cumbersome equipment and, most importantly, the residual amounts of the amine acetate that remain as a contaminant.

Still another prior art method utilizes filtration or combined filtration-settling processes with chemically treated filter mediums for purifying laundry wastes. However, such systems have generally proven unsuitable for high volume operations because laundry wastes in combination with flocculating or settling agents develop a slime upon the filter element that soon clogs the filter passages and prevents effective filtering.

Heretofore, attempts have been made to filter slime materials through a compressible filter medium coated on a filter base by both constant-rate filtration methods and falling-rate filtration methods. Constant-rate filtration methods suffer from rapid pressure drop increases, sudden turbidity breakthroughs and low quantity of effluent. Falling-rate filtration methods result in low volume output, inability to keep particles suspended in the filter chest, pre-coat separation from the supporting septum and a general loss of effluent quality.

Generally, it is known that filtration of slime solids with a compressible filter cake is most satisfactorily effected by a constant-rate filtration. This is based upon the belief that the most efficient filtration of a slime-forming product is attained by keeping the filter cake in an uncompressed condition for as long as possible. Therefore, as the slime forms, the pressure is not increased appreciably, thus keeping the filter passages open. Furthermore, the prior art teaches that the overall filtration rate is not significantly increased by an increase of pressure as this merely compresses the cake and chokes the flow passages.

It is apparent from the above discussion that the art has proceeded along two separate but related lines of attack upon the general problem involved. These lines of attack are (1) a physical separation by means of filtering and (2) a chemical or physico-chemical separation by means of flocculation and chemical complexing. Neither of these has provided a practical solution.

SUMMARY OF THE INVENTION

We have found that a plurality of short surging cycles of constant pressure-falling rate filtration through a compressible filter medium unexpectedly and significantly improves the filtering of slime forming wastes. Briefly stated, the present invention comprises a complete scheme for purifying laundry wastes and the like in accordance with the following steps: (a) contacting a laundry waste with an excess of the stoichiometric amount of an acid salt of an abietic acid amine to form a colloidal amine-surfactant complex within said laundry waste; (b) preferably allowing said mixture to age; and (c) filtering said mixture containing the complex, unreacted amine and other laundry contaminants through a compressible absorption filter medium having absorbent and/or ion exchange properties, said filtration being affected by a plurality of relatively short surging cycles of constant pressure-falling rate filtration.

We have found that treatment of laundry wastes according to the above process, in combination, solves the three basic problems that have plagued those attempting to proceed independently by way of chemical or physical separation. Namely, this method provides (a) amine complexing of laundry anionic surfactants without large quantities of chemicals and equipment, (b) removal of residual unreacted amine from the contacted mixture, and (c) rapid and efficient filtering of colloidal and slime-forming wastes.

Accordingly, it is the primary object of this invention to provide a complete method for treating liquid wastes generally, and laundry wastes particularly, comprising in combination a chemical separation wherein anionic surfactants are complexed, and a physical separation wherein colloidal and slime products are filtered.

It is another object of this invention to provide a method specifically applicable for removing anionic surfactants through amine complexing that does not require large quantities of chemicals, does not require cumbersome equipment and that substantially completely removes residual amine compounds.

It is a further object of this invention to provide a filtration method for the efficient removal of absorbably suspended solids and colloidal contaminants from highly turbid waste waters in general and slime-forming waste products in particular.

DESCRIPTION OF PREFERRED EMBODIMENTS

In accordance with this invention, laundry waste is contacted with a water soluble salt of an abietic type acid amine and another acid, more particularly defined below. The acid salt should be present in an amount such that the ratio of salt to anionic surfactant is between about 0.5:1 and 4.0:1 and preferably between about 1:1 and 2.5:1. The optimum ratio is about 1.5:1.

The acid that is to be reacted with the abietic acid amine must form a salt that is substantially water soluble in the concentrations used and the resultant pH of the water after addition of the salt must be less than 7.0. Such acids include, but are not limited to acetic, propionic, maleic, hydrochloric and nitric.

In a preferred practice, hydrochloric acid is reacted with dehydroabietylamine using stoichiometric quantities or a slight excess of acid. The preferred pH of the resulting water is between about 6.2 and 6.9 and because of the weak base-strong acid reaction this pH range is generally attained.

The contacted solution may be aged for a period up to ¾ of an hour and preferably about ½ hour under mixing conditions.

After contacting the impure solution with the amine acetate, and aging where desirable, the resultant mixture is passed through a cellular type filter. Filters suitable for the invention, in addition to restraining the passage of particulate material, are characterized by having absorptive and ion-exchange properties. The ion-exchange activity is vital to the invention because it removes the residual amine acetate.

The filtering action is required because typical laundry wastes contain insoluble silicaceous matter, grease and oils, lime and other particulate material. Further, the complex formed by the reaction between the abietylamine acid salts and the anionic surfactants is colloidal in nature and therefore, to a degree filterable. In addition, its is known that the complex formed may be absorbed from an aqueous solution. Thus, the filter medium will aid in the removal of the complex. The ion-exchange action is specifically directed toward solution of the prior art problem of inability to remove residual soluble abietylamine acid salts and micellar aggregates thereof.

We have found that paper in general and particularly commercial newsprint is suitable for use as a filter medium and is an economical source for a material possessing the above-described characteristics. Ion exchange properties are imparted to newsprint from carboxylic groups inherent in the cellulose structure; carboxylic groups provided by oxidation of hydroxyl groups during the bleaching process by which newsprint is reclaimed; phenolic acid activity from lignin in the ground wood portion of the furnish; and sulfonic acid groups in the lignin. The term "newsprint" as used herein refers to a cellulosic material which has been processed for use as a paper for the printing of newspapers and which is generally derived from suitable trees such as spruce, fir, aspen and pine trees. This also includes paper that has previously been used for printing.

In accordance with our invention a suitable filter is precoated with a thin coating of a compressible filter medium, for instance a mixture of newsprint and diatomaceous earth, to form a coating of about 0.1 pound per square foot on the filter surface. This is substantially less than the amounts generally used in filtration methods. The laundry waste which has been chemically treated is passed through the filter by a suitable pump to provide a constant pressure drop of about 30 p.s.i.g. During the initial stages of filtration the loosely packed precoat absorbs and filters "in depth of the cake" until compression of the filtering medium, which occurs as a function of time and pressure is affected. After this compression takes place a second stage is entered, wherein only the surface of the compressed filter medium functions and filtration is affected by said filter medium acting as a filter barrier. The pressure drop is then increased to a point just less than the amount which will cause a filter breakthrough, and even though the compressed filter is exhibiting asymptotically falling rates the higher pressure drop produces an increased flow rate during this period. The preferred cycle period is about 45 minutes. However, operations with cycles from 45–90 minutes have been successful. The pressure drop useful with the present preferred embodiment is between about 30–55 p.s.i.g., however, this is dependent upon specific parameters such as the filter medium employed and the concentration of the material to be filtered.

The following example will further illustrate the practice of our invention.

A standard synthetic laundry waste mixture having a typical anionic surfactant therein, was prepared, said mixture comprised an aqueous mixture of:

|   | P.p.m. |
|---|---|
| Arylalkylsulfonate | 60 |
| Sodium tripolyphosphate | 200 |
| Trisodium phosphate | 50 |
| Sodium hypochlorite | 4 |
| Urea | 5 |
| Sodium carboxymethyl cellulose | 5 |
| Animal fat (lard) | 5 |
| Ammonium carbonate | 5 |
| Magnesium sulfate | 30 |
| Sodium chloride | 50 |
| Sodium carbonate | 50 |

Two thousand four hundred and forty-eight grams of dehydroabietylamine was added to 544 ml. of 80% acetic acid in 6.77 liters of water. The resultant product was a solution of dehydroabietylamine acetate. Dehydroabietylamine acetate was added to a portion of said synthetic mixture to provide a sample having a final concentration of 90 p.p.m.

A pulp slurry was formed by macerating newsprint in a colloid mill filled with water. The weight ratio of water to dry paper was about 165:1. Slurry was added to the sample to provide a concentration of 50 p.p.m. The solution was allowed to age for ½ hour.

Another portion of the macerated newsprint slurry was combined with 10% by weight of a diatomaceous earth and used to precoat a braided stainless steel filter element at a dry density of about 0.10 lb./sq. ft.

The treated and aged mixture was then filtered through the pre-coated filter in the following manner.

Filtration was initiated at a pressure of about 30 p.s.i.g. and a rate of 2.4 g.p.m./ft.$^2$ (gallons per minute per square ft.). The freshly applied and loosely packed precoat filtered and absorbed in depth for about 20 minutes and then the macerated newsprint collapsed. During this phase, most of the effluent was produced. The second phase of the filtration was then initiated by increasing the pressure to about 60 p.s.i.g. (just below the point where a turbidity breakthrough would occur). During this phase the rate of filtration, which decreased during the first phase, was low, approaching 0.2 g.p.m./ft.$^2$. After about 25 minutes the point was reached where the volume of effluent produced with time was not worth the work input. Then the surging cycle ended, backflushing and draining in a collecting device using burlap bags that readily drains off excess water were affected, and a new cycle with a new precoating was initiated.

An analysis of the effluent indicated that the concentration of the anionic surfactant, arylalkylsulfonate, had been reduced to less than 1.0 p.p.m. and no dehydroabietylamine was detected. This type of complexing and filtration process is applicable to all anionic surfactants of the type commonly used in detergents.

The combination of the chemical and physical separations resulted in the removal of the colloidal suspension of anionic surfactant. The method of this invention provides for substantially complete removal of anionic surfactants by chemical complexing followed by a unique filtration process for the removal of the complex, and colloidal and slime products from liquid wastes in general and laundry wastes in particular.

It is to be understood that although the invention has been described with specific reference to particular embodiments thereof, it is not to be so limited, since changes and alterations therein may be made which are within the full intended scope of this invention as defined by the appended claims.

We claim:
1. A process for removing absorbably suspended solids and anionic surfactants from waste water comprising:
   (a) contacting said water with a suitable amount of an acid salt of an abietic acid amine to form a colloidal amine-anionic surfactant complex; and
   (b) filtering said colloidal amine-anionic surfactant complex through a compressible absorption filter medium having ion exchange properties, said filtration being affected by a plurality of relatively short surging cycles of constant pressure and falling rate whereby the water collected from said filter is substantially completely free of said anionic surfactants, unreacted amine and other colloidal contaminants.
2. A process in accordance with claim 1 wherein the ratio of the acid salt of the abietic acid amine to anionic surfactant is about 0.5:1 to 4.0:1.
3. A process in accordance with claim 1 wherein the compressible absorption filter medium having ion exchange properties is newsprint.
4. A process in accordance with claim 1 wherein the compressible absorption filter medium having ion exchange properties is newsprint and diatomaceous earth.
5. A process in accordance with claim 1 wherein the abietic acid amine and said water are contacted for up to about ¾ hour before filtering.

References Cited

UNITED STATES PATENTS

| | | | |
|---|---|---|---|
| 3,037,635 | 6/1962 | Boorujy | 210—75 X |
| 3,574,098 | 4/1971 | Boorujy | 210—75 X |
| 3,352,424 | 11/1967 | Guebert et al. | 210—75 X |
| 3,259,568 | 7/1966 | Jordan et al. | 210—28 |
| 3,389,081 | 6/1968 | Eckenfelder et al. | 210—54 X |
| 3,232,867 | 2/1966 | Abrams | 210—75 X |

OTHER REFERENCES

Vaughn, J. C., et al., Detergents in Water Supplies, Ind. & Eng. Chem., 48 (1956), pp. 241–245.

Borglin, J. N., Soap and Sanitary Chemicals, December 1947, p. 147, 149, 167.

REUBEN FRIEDMAN, Primary Examiner

T. G. WYSE, Assistant Examiner

U.S. Cl. X.R.

210—40, 75